United States Patent [19]
Brenner

[11] 3,821,663
[45] June 28, 1974

[54] INTEGRAL REFLECTING CAVITY SEMICONDUCTOR PUMPED LASER

[75] Inventor: Charles H. Brenner, Scottsdale, Ariz.

[73] Assignee: Motorola, Inc., Franklin Park, Ill.

[22] Filed: Jan. 15, 1973

[21] Appl. No.: 323,480

[52] U.S. Cl. .................................... 331/94.5 R
[51] Int. Cl. ............................... H01s 3/09
[58] Field of Search ................................... 331/94.5

[56] References Cited
UNITED STATES PATENTS

| | | | |
|---|---|---|---|
| 3,624,545 | 11/1971 | Ross | 331/94.5 |
| 3,663,893 | 5/1972 | Ostermayer, Jr. | 331/94.5 |
| 3,683,296 | 7/1972 | Scalise | 331/94.5 |
| 3,711,789 | 1/1973 | Dierschke | 331/94.5 |

Primary Examiner—William L. Sikes
Attorney, Agent, or Firm—Vincent J. Rauner; Victor Myer

[57] ABSTRACT

The laser rod which may be Nd:YAG is reflectively coated over all of its surfaces except the ends and a narrow strip extending along the surface of the rod and parallel to its axis. An array of light emitting diodes of either non-coherent (spontaneous) light emitting type or coherent (laser) light emitting type are disposed with the light emitting direction being through the narrow strip. A metallic heat sink completely surrounds the sides of the laser rod except for the elongated strip, and is in good thermal conducting relation with the rod. A metallic heat sink is in good heat conducting relation with the light emitting diodes and is separated by an insulating spacer from the laser rod heat sink. The light emitting diodes are in a chamber defined by the laser rod, the heat sinks, and the insulating spacer. The chamber may or may not be filled with a clear optical cement.

10 Claims, 6 Drawing Figures

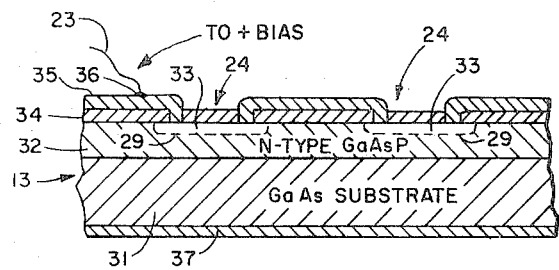
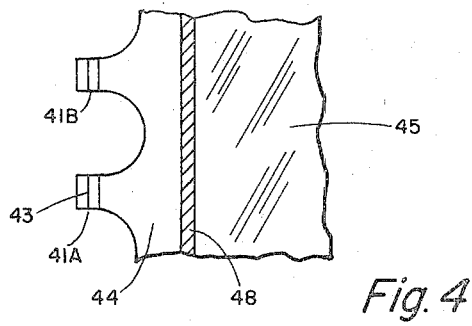
Fig. 3
Fig. 4
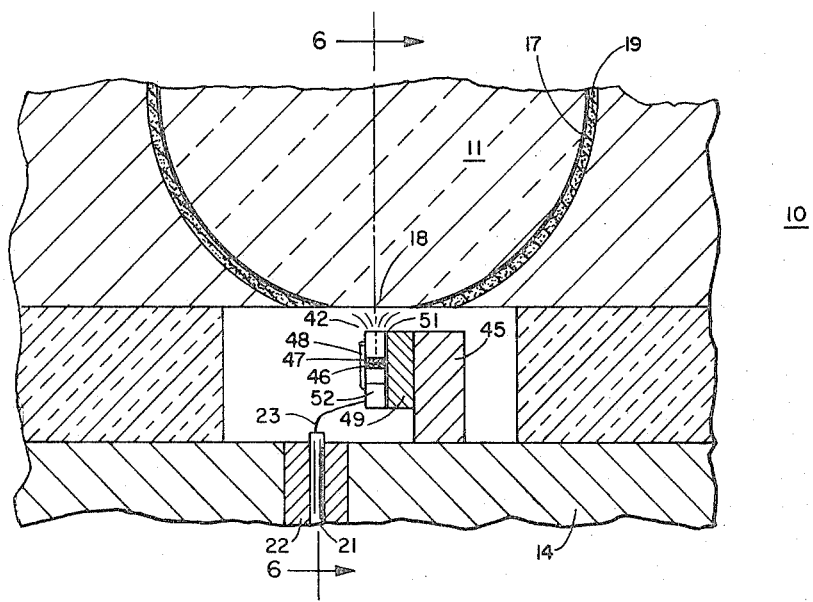
Fig. 5
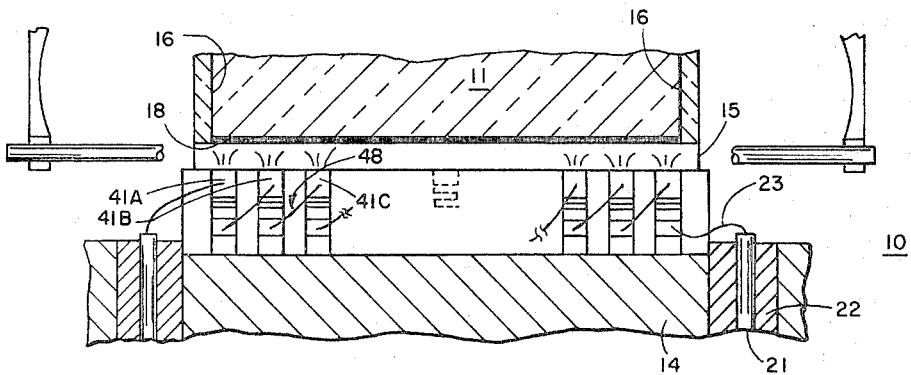
Fig. 6

3,821,663

INTEGRAL REFLECTING CAVITY SEMICONDUCTOR PUMPED LASER

BACKGROUND OF THE INVENTION

This application relates to optical masers, or lasers, and more particularly to lasers wherein the light pumping is achieved through light emitting diodes, and it is an object of the invention to provide improved lasers of this nature.

In a specific form of the invention, lasers using neodymium ions in yttrium aluminum garnet crystal (Nd:YAG) are disclosed, but this is by way of example inasmuch as other materials for particular circumstances may be utilized.

Lasers have been pumped by gas discharge lamps as well as incandescent lamps both of which have short lifetimes and are inefficient. Likewise, lasers have been pumped by using arrays of light emitting diodes of gallium arsenide, gallium arsenide phosphide, or similar materials as an energy source. Laser systems using the latter without more, likewise are also inefficient.

The light emitting diode versions may be constructed to emit light at the appropriate wave lengths, such for example as 0.81 $\mu$m (micrometers) which correspond to one of the absorption peaks of the Nd:YAG crystal. However, in such known systems the light generated is still inefficiently used. Also, the heat generated in the light emitting action of the diodes, as well as that generated in the lasing action of the laser generator is inefficiently conducted away. The overall efficiency of the laser is thus substantially reduced.

Accordingly, it is a further object of the invention to provide an improved laser system which obviates the disadvantages of the prior art.

It is a further object of the invention to provide an improved laser system of the nature described which is efficient in light usage, cool in operation, and simple to construct.

It is a further object of the invention to provide an improved laser system of the nature indicated which is economical to manufacture.

Other objects and advantages of the invention will become apparent as the description proceeds.

SUMMARY OF THE INVENTION

According to one form of the invention, laser apparatus which comprises an elongated lasing rod having side and end surfaces, a reflective metallic coating over essentially all of the surface of the lasing rod except the end surfaces, but including a narrow-strip light opening therein, a series of closely spaced light emitting diodes disposed with their light emitting areas closely adjacent said narrow-strip light opening, a first heat sink member surrounding essentially all of the lasing rod, a second heat sink member for the light emitting diodes spaced from the first heat sink member, and a heat insulating spacer separating the first and the second heat sink members and defining a chamber in the vicinity of said narrow-strip light opening which contains the light emitting diodes.

According to a further form of the invention, there is provided laser apparatus which comprises an elongated Nd:YAG crystal rod having side and end surfaces, a reflective coating over essentially all of the surface of the lasing rod except the end surfaces, but including a narrow-strip light opening therein extending longitudinally thereof, a series of closely spaced GaAs spontaneous light emitting diodes, or laser diodes disposed with their light emitting areas closely adjacent and in line with the narrow-strip light opening, and being arranged for emission of laser radiation, a first metallic heat sink member surrounding essentially all of said lasing rod, a second metallic heat sink member for said light emitting diodes spaced from the first heat sink member, a heat insulating spacer separating the first and the second heat sink members and defining a chamber in the vicinity of the narrow-strip light opening which contains the light emitting diodes, and may or may not contain an optical material filling the chamber and having an index of refraction which approximates that of said Nd:YAG material.

Moreover, a reflecting coating may be disposed on the side of the diodes opposite to the emitting area.

BRIEF DESCRIPTION OF THE DRAWINGS

FIG. 3 is a sectional view of one form of light emitting diode useful in the invention;

FIG. 4 is a sectional view of a further form of light emitting diode useful in the invention;

FIG. 5 is a sectional view, of one form of laser diodes useful in the invention; and FIG. 6 is a sectional view taken along lines 6—6 of FIG. 5, but on a reduced scale.

DESCRIPTION OF THE PREFERRED EMBODIMENTS

Figure 1:
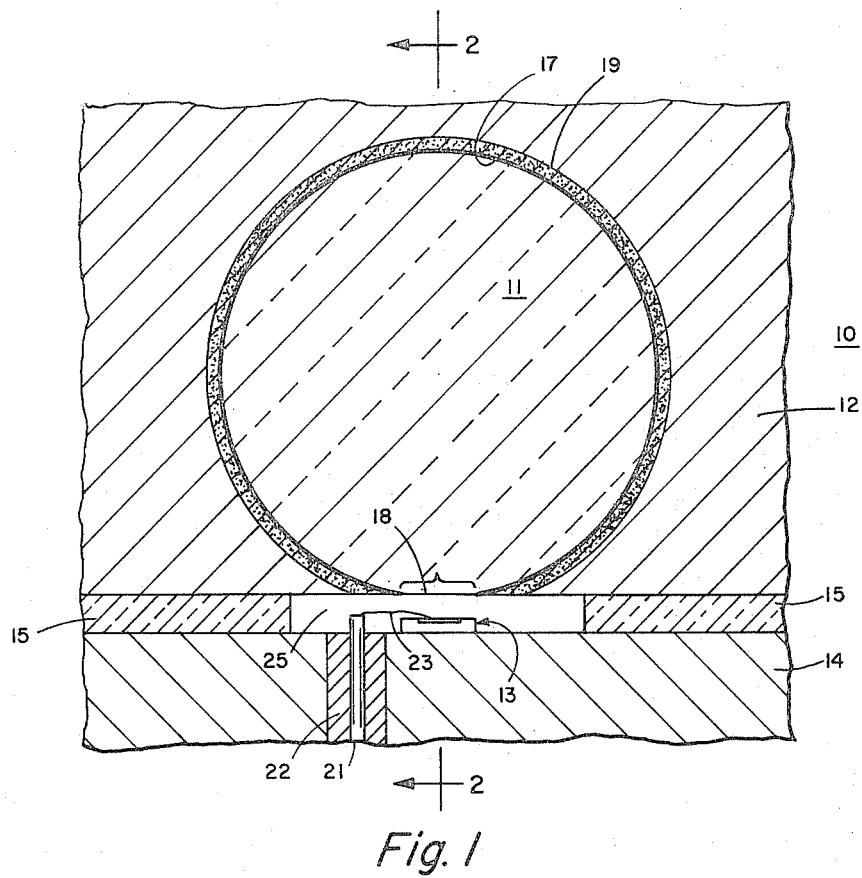
FIG. 1 is a cross-sectional view on an enlarged scale of laser apparatus according to the invention.
Figure 2:
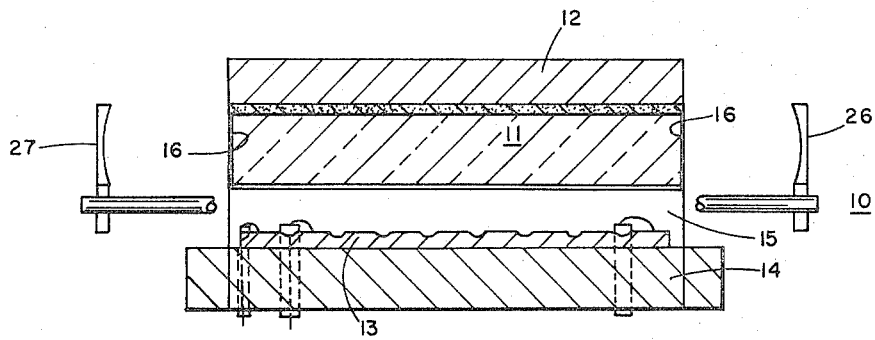
FIG. 2 is a sectional view on a reduced scale taken along the lines 2—2 of FIG. 1.

Referring to FIGS. 1 and 2 of the drawings, a laser system 10, according to the invention, is shown comprising a laser rod 11, a heat sink 12 surrounding the laser rod 11, a light emitting diode array 13, a heat sink 14 and a thermal insulating layer 15 separating the heat sink members 12 and 14.

The laser rod 11 may be an article of commerce comprising a yttrium aluminum garnet crystal doped with neodymium. In one form the rod may have a diameter of about 3 millimeters and a length of about 50 millimeters. The ends of the rod are accurately ground to be parallel to each other and perpendicular to the axis of the rod. The ends are polished and coated with a nonreflecting multilayer dielectric material 16. The laser rod 11 is shown as a right circular cylinder, and this is a preferred form, but the rod may have other cross-sectional shapes as is well understood.

The outside of the cylinder is highly polished and is coated with a highly reflecting layer such, for example, as a layer 17 of gold. A narrow slit 18 is formed in the gold layer, is parallel to the axis of the rod, and is disposed closely adjacent the diodes 13 as shown.

The reflecting coating covered laser rod 11 is mounted inside of the heat sink 12 so that the heat sink virtually surrounds the laser rod to its full extent as shown. Only the area in the immediate vicinity of the diodes 13 is not surrounded by the heat sink 12. In order to form good thermal contact between the laser rod 11 and the adjacent surface of the heat sink 12 there is a layer 18 of a bonding agent, such as silicon grease 19, which has been optimized as to its high thermal conductivity. Such silicon greases are well known to the art.

The light emitting diodes 13 may comprise a strip series of diodes (FIG. 3), the strip being bonded to the upper surface of heat sink 14 in good heat transfer relationship. Lead-in conductors 21 insulated from the metallic heat sink 14 by suitable insulators 22 bring in energization to the light emitting diodes 13 through conductors 23. The diodes being in the form of strips approximately 20 mils wide with about 20 mils between diode centers enables the diodes to be closely spaced to the gap 18 in the reflecting coating. The emitting areas 24 of the light emitting diodes (FIG. 3) may be about 15 by 15 mils in area.

The insulating spacers 15 and the heat sinks 12 and 14 combine to form a relatively small chamber 25 in which the diode strips 13 and the lead in wires 23 are disposed. The chamber 25 may be filled with a clear optical cement which may be any of the well known forms of clear epoxy materials having an index of refraction in the vicinity of 1.7 to 1.82. The latter matches the index of refraction of the laser rod. This greatly reduces the optical loss caused by total internal reflection in the diode by reflections from other interfaces. The heat transfer coefficient of the cement is low enough so that most of the diode heat is removed through the heat sink and is not transferred to the laser rod. Ideally the space 25 would be filled with a fluid having a high heat capacity that could be circulated to aid in cooling. Circulating liquids having an index of refraction required to match the yttrium aluminum garnet value of 1.82 is not known to be available. If a fluid with low index of refraction is used in the space 25 or if the space is filled with air the efficiency of the diode will be reduced by a factor of one-third to one-fifth because of increased losses caused by total internal reflection. (The diodes in one form are of gallium arsenide.)

The laser rod 11 is placed in the center of the laser resonant cavity which is formed by two spherical members 26 and 27 held in place by any suitable means such for example as by invar rods 28, which in turn are supported in any appropriate manner relative to the apparatus. The spacing of the mirrors 26 and 27 is chosen to be slightly longer than the laser rod which in this particular case is typically 5 cm. The mirrors 26 and 27 may be dispensed with in some instances and instead form mirrors by reflectively coating the ends of the laser rod instead of having nonreflecting coatings 16. The latter system may be somewhat simpler, but it has the disadvantage of prohibiting the use of any mode selection or Q-switching techniques inasmuch as these require that devices be placed in the optical path inside the laser resonant cavity which is impossible if the path is completely inside of the laser crystal.

Since the laser rod is about 50 millimeters long, about 100 diodes on one-half millimeter centers can be fitted into a single line. Each diode must therefore provide about 5 mW (milliwatts) of optical output power to reach the lasing threshold value.

The critical angle of reflection when diodes are coated with an optical cement whose index of refraction of 1.82 such as is placed in the cavity 25 is about 31°. The fraction of photons that have a chance of escaping from the diode surface is thus approximately 0.07, neglecting absorption losses. Absorption losses are difficult to estimate and exact numerical values for the absorption coefficient are unobtainable.

Previous semiconductor pumped sources or lasers have used individually packaged gallium arsenide phosphide diodes. Individual packaging increases the cost of the diode, greatly reduces the packing density, and requires that the diodes have a large physical separation from the laser rod. The system according to the invention uses a linear array of diodes which are cleaved directly from the gallium arsenide phosphide wafer. The net result is a rectangular pumping source whose physical form factor is matched very well to the long slender laser rod.

Previous flash lamp and semiconductor lasers have been external reflecting cavities. By utilizing a long narrow rectangular pumping source which can be placed physically very close to the laser rod, a new type of reflecting cavity, according to the invention, called an internal cavity can be used. The internal cavity is formed by simply depositing a reflecting coating on the exterior surface of the rod excluding the ends. A very small narrow slit running axially of the rod is made in the reflective coating to allow light from the semiconductor pump to be accepted by the laser rod. High pumping efficiencies can be achieved using this method since once the pump power gets into the laser rod, the probability of it escaping is relatively small.

Referring to FIG. 3 there is shown a simplified diagram of a LED (light emitting diode) operating in the spontaneous emission mode. Light is spontaneously emitted from the plane of the P-N junction 29 when electron-hole recombinations occur. This light is emitted isotropically, that is, in random directions from the point of recombination. However, very little of the light generated at the junction escapes from the surface 24 of the diode. Typical power efficiency (optical power out divided by electrical power in) for a spontaneously emitting LED is about 1 to 2 percent at room temperature.

The LED array 13 may be formed by depositing on a gallium arsenide (GaAs) substrate 31 an N-type layer 32 of gallium arsenide phosphide (GaAsP), the doping level being as desired for the wave length of light wanted. The layer 32 may be grown epitaxially on the substrate 31 for example. A P-type impurity is diffused into the epitaxial layer 32 to form the junctions 29, the diffused areas being identified by the reference character 33. The gallium arsenide phosphide layer 32 and the light emitting areas 33 are coated with some material 34 that has an index of refraction intermediate to that of gallium arsenide phosphide and that of air, thereby to increase the critical angle and reducing the internal reflection losses. The coating layer 34 may, for example, be of silicon dioxide or silicon nitride which are two materials having an index of refraction in the area desired. The proper coating can double the diode efficiency compared to a bare diode chip.

Metallizations 35 are deposited over the reflecting layer 34 after suitable windowing for enabling the metal layers to contact the diffused areas 33. A connection 36 may be made to the diffused areas 33 by means of a conductor 23. If the diodes on the array as shown in FIG. 3 are all intended to be connected in parallel a single connection to the metallization 35 as shown will suffice, the other connection being made to the substrate 31 as is well understood. If it is desired that the diodes be operated in series the metallization layer may be suitably interrupted and additional connections made to the appropriate metallization layers as is well understood. The necessary number of lead-in conductors will increase, of course, as is well understood.

The diode array as shown in FIG. 3, and as already stated, is of the spontaneous emission type, or an ordinary LED. In this instance the arrays may be formed by scribing the wafer into which the diffusions have been made and onto which metallizations have been made at the appropriate dimensions. Appropriate numbers of diodes are formed in each one of the chips formed by the scribing and breaking process. The array of diodes may be divided into a series of mesa form diodes, for example, as is well understood. The substrate 31 may have a metallized layer 37 formed thereon which is bonded to the heat sink 14 for good heat transfer.

In FIG. 4 there is shown a laser diode array 41 emitting coherent type light as compared with the random or spontaneous emission type. In this instance a series of diodes are formed by first appropriately doping a wafer of a crystal of gallium arsenide phosphide whose crystallographic orientation is of the [100], Miller indices, type. After so growing the crystal and doping it, the wafer is cleaved along the appropriate lines, or planes, thereby forming the diode crystals in such a manner that the light emitted when the diodes are energized is parallel or along the plane of the junction. This may be visualized in FIG. 5 by the emanation of the rays 42 and the showing of the junction 43 between the two portions of the diode lying in a narrow line coextensive with the interrupted strip 18 of coating 17.

In FIG. 5 the diodes 41 which may be in the form of a mesa are shown in an array of diodes on the substrate 44 attached, as by bonding to give good heat transfer, to a header or support 45.

The laser light emitting diodes 41 after being formed, basically, are divided into individual mesa diodes 41A, 41B, 41C, etc., and have a layer 46 of reflecting metal, for example gold, deposited along one edge as shown. Before the metallic layer 46 is deposited there is an insulating layer 47 such, for example, as silicon dioxide which is bonded to the edge of the diode as shown. The supporting substrate 44 of the mesa may have its rearward suface metallized with a layer 47 which is bonded to the header or support 45 for good heat transfer. The supporting member 45 may in turn be bonded to the heat sink 14 as shown. In FIGS. 4, 5 and 6, except for the differences in the laser mode diodes as compared with the random emission diodes, the construction of the apparatus is the same. Corresponding reference characters for the same parts are shown.

As may be visualized in FIGS. 5 and 6 the diodes 41A, 41B and 41C may be connected in series with each other by appropriate conductors 48, the conductor 23 being fed from a lead-in conductor 21 insulated from the heat sink 14.

The diodes 41A, 41B and 41C, etc., may be formed by bonding a strip containing the diodes to a substrate 49 of beryllium oxide, for example, through a metallic layer 51. A strip 52f highly doped gallium arsenide, for example, is also bonded to the layer 51. The latter doping should be sufficiently heavy so that the strip 52 is a good conductor.

After bonding the two strips 51 and 52 are formed into individual units 41A etc., as by saw cutting. The saw cut severs the metal film as well so that the units 41A, etc., and 52A, etc., are separate but connected together. Conductors 48 extend diagonally from one side of each diode to the same side of the units 52A, etc. The units 52A being of the same height as the diodes 42A, etc., the conductors 48 lie essentially flat. No bends are present to complicate the bonding process or to reduce the quality thereof.

If desired, the diodes may be connected in parallel as is well understood.

As may be visualized in FIGS. 5 and 6 the light emission 42 being along the plane of the junctions is fed directly into the laser rod by virtue of the gap 18 in the reflective coating 17. The light emission wavelength is selected to correspond to one of the efficient absorption bands of the laser crystal as is well understood. More than one gap or slit 18 may be provided with additional rows light pumping diodes for quarter light pumping capacity if desired.

Light pumping can, of course, be either by spontaneous or coherent light emission.

In all areas of the laser rod 11 where there is no light pumping occurring, gold film, or the like, may be attached to maintain the light retention at a high level.

While the invention has been shown in connection with certain specific examples, it will readily be apparent to those skilled in the art that various changes in form and arrangement of parts may be made to suit the requirements without departing from the spirit and scope of the present invention.

What is claimed is:

1. Laser apparatus comprising:
   an elongated lasing rod including side and end surfaces;
   a reflective metallic coating over essentially all of the surface of said lasing rod except said end surfaces, but including a narrow strip light opening therein;
   a series of closely spaced light pumping diodes disposed with their light emitting locations closely adjacent said narrow-strip light opening;
   a first heat sink member surrounding essentially all of said lasing rod;
   a second heat sink member for said light pumping diodes spaced from said first heat sink member; and
   a heat insulating spacer separating said first and said second heat sink members and defining a chamber in the vicinity of said narrow light opening and containing said light emitting diodes.

2. The laser apparatus according to claim 1 wherein said chamber is filled with optical material whose index of refraction matches that of the material of said laser rod.

3. The laser apparatus according to claim 1 wherein a layer of good heat conductivity material is disposed between the metallic coating on the laser rod and the surrounding heat sink.

4. The laser apparatus according to claim 1 including means for energizing all of said light pumping diodes at the same time.

5. The laser apparatus according to claim 1 wherein said light emitting diodes are oriented for spontaneous light emission.

6. The laser apparatus according to claim 1 wherein said light emitting diodes are oriented for coherent light emission.

7. The laser apparatus according to claim 5 wherein the plane of the light emitting junctions of the diodes is parallel to a plane tangential to the surface of the said laser rod.

8. The laser apparatus according to claim 6 wherein the plane of the light emitting junctions of the diodes are perpendicular to a plane tangential to the surface of said laser rod.

9. Laser apparatus comprising:
- an elongated Nd:YAG crystal rod having side and end surfaces;
- a reflective coating over essentially all of the surface of said lasing rod except said end surfaces, but including a narrow light opening therein extending longitudinally thereof;
- a series of closely spaced GaAs light emitting diodes disposed with their light emitting locations closely adjacent and in line with said narrow light opening and being arranged for the emission of laser radiation;
- a first metallic heat sink member surrounding essentially all of said lasing rod;
- a second heat sink member for said light pumping diodes spaced from said first heat sink member;
- a heat insulating spacer separating said first and said second heat sink members and defining in the vicinity of said narrow light opening and containing said light pumping diodes; and
- optical material filling said chamber and having an index of refraction which matches that of said Nd:YAG material.

10. Laser apparatus acccording to claim 9 wherein each of said light pumping diodes includes a light reflective coating on the junction edge opposite to the emitting edge of the junction.

* * * * *